United States Patent [19]
Fernald et al.

[11] 3,721,719
[45] March 20, 1973

[54] PROCESS FOR CONVERTING ETHYLENE TO NORMAL ALPHA OLEFINS

[75] Inventors: Herbert B. Fernald, Glenshaw, Pa.; Donald E. Hillier, Jr., Baytown; Charles F. Hughes, Jr., Houston; John R. Strausser, Baytown, all of Texas

[73] Assignee: Gulf Research & Development Company, Pittsburgh, Pa.

[22] Filed: Aug. 27, 1970

[21] Appl. No.: 67,624

[52] U.S. Cl. ........................................260/683.15 D
[51] Int. Cl. ................................................C07c 3/10
[58] Field of Search ............................260/683.15 D

[56] References Cited

UNITED STATES PATENTS

| | | | |
|---|---|---|---|
| 3,310,600 | 3/1967 | Ziegler et al. | 260/683.15 |
| 3,391,175 | 7/1968 | Davis | 260/683.15 X |
| 3,457,322 | 7/1969 | Wentz | 260/683.15 |
| 3,482,000 | 12/1969 | Fernald et al. | 260/683.15 |
| 3,531,253 | 9/1970 | Fernald et al. | 260/683.15 X |

Primary Examiner—Paul M. Coughlan, Jr.
Attorney—Meyer Neishloss, Deane E. Keith and Joseph J. Carducci

[57] ABSTRACT

In a process wherein an ethylene stream containing ethane is treated with an aluminum hydrocarbon to obtain a product predominating in normal alpha olefins, the improvement which involves substantially reducing the ethane content of the ethylene stream in order to improve catalyst efficiency, reactor efficiency and reactor productivity.

1 Claim, No Drawings

PROCESS FOR CONVERTING ETHYLENE TO NORMAL ALPHA OLEFINS

The stepwise conversion of gaseous ethylene to higher straight chain, normally liquid olefins having the double bond in the terminal or alpha position can proceed as follows:

$$CH_2=CH_2 + CH_2=CH_2 \rightarrow CH_3-CH_2-CH=CH_2$$
$$CH_3-CH_2-CH=CH_2 + CH_2 = CH_2 \rightarrow CH_3-CH_2-CH_2CH_2-CH=CH_2,$$ etc. This polymerization occurs catalytically in the presence of organometallic compounds, such as aluminum alkyls, which participate in the reaction. As the reaction proceeds in the presence of excess ethylene, an increasing quantity of gaseous ethylene is converted to liquid olefin so that the density of the reaction system progressively increases. The chemistry of the alpha olefin process, defined and claimed herein, can be described in terms of three major reactions.

In the propagation (growth) reaction, the hydrocarbon group, for example, an alkyl group on an aluminum atom containing $n$ ethylene units, can add an ethylene molecule to become an alkyl group of $n+1$ ethylene units as follows:

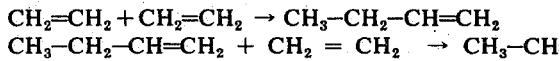

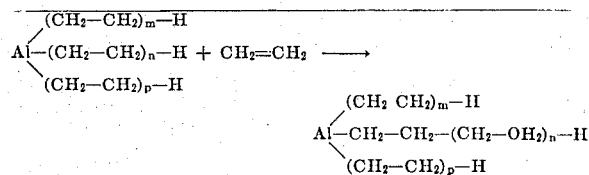

The different subscript used at each $C_2$ group indicates that a different stage of growth at each group is likely.

The transalkylation (displacement) reaction, which occurs concurrently with the growth reaction herein, consists of two steps. These are, first, thermal decomposition of an aluminum alkyl group to a hydride plus alpha olefin, followed by a rapid reaction of the hydride with ethylene to regenerate an ethyl group which can start another growth cycle. The thermal decomposition is much slower than reaction of ethylene with a hydride and, therefore, is the rate-determining step for the over-all reaction:

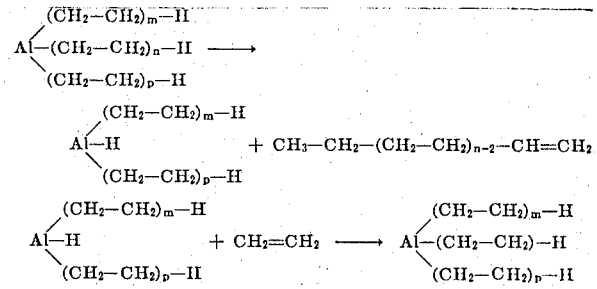

The growth and displacement reactions occur repeatedly as long as there is unreacted ethylene present. Therefore, the reaction is advantageously afforded an relatively long residence time. As long as there is free ethylene in the presence of catalyst in the reactor under reaction conditions, each mol of catalyst present will produce additional normal alpha olefin product. Therefore, a long residence time is conducive to a high alpha olefin yield per mol of catalyst, i.e., a relative high catalyst efficiency.

The third reaction is similar to the first, except that a product alpha olefin can add to the aluminum alkyl, rather than ethylene, to form a branched chain aluminum alkyl group. However, this structure is quite unstable and rapidly decomposes to form a hydride and an olefin having a vinylidene structure:

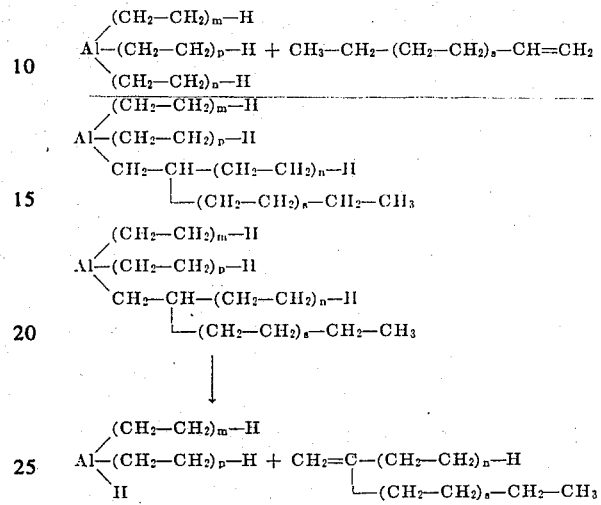

The subscript s can be different from the subscript previously employed above. The decomposition is so rapid compared to the addition of another ethylene molecule to the branched alkyl that essentially all reactions of this type result in an olefin of vinylidene structure and regeneration of an aluminum ethyl alkyl group. As a result, there will be few, if any, alpha olefins with branching beyond the beta carbon.

Low temperatures favor the growth reaction and will result in a higher average molecular weight product. At high temperatures, the average molecular weight will be lower because the transalkylation reaction predominates. The proportion of $C_{12}$ alpha olefin in the product tends to remain relatively constant with temperature changes within the most preferred range of this invention, however, with lower temperatures favoring a relatively higher proportion of product above $C_{12}$ and higher temperatures favoring a relatively higher proportion of product below $C_{12}$.

In view of the fact that the production of normal alpha olefins is the object of the above reactions, ethylene is the sole olefin which can be employed in the charge. The normal alpha olefins produced will have from four to 40 even-numbered carbon atoms, primarily from four to 20 even-numbered carbon atoms, and will be substantially liquid with practically no solid polymer produced except as undersired product. The normal alpha olefins produced, particularly the $C_{12}$, $C_{14}$ and $C_{16}$ alpha olefins, have high utility for the production of detergents.

The catalyst employed herein can be defined by the following structural formula

, wherein $R_1$, $R_2$ and $R_3$ can by any hydrocarbon substituent. However, since the hydrocarbon substituent is easily and quickly replaced with ethylene, or an alpha olefin produced herein, and the resultant aluminum trialkyl becomes the effective catalyst, it is apparent that the catalyst herein is an aluminum trialkyl wherein the alkyl portions thereof have from two to 40 carbon atoms, preferably from two to 30 carbon atoms. Examples of such catalysts which can be employed are $Al(CH_3)_3$, $Al(C_2H_5)_3$, $Al(C_3H_7)_3$, $Al(C_4H_9)_3$, $Al(C_5H_{11})_3$, $Al(C_9H_{19})_3$, $Al(C_{12}H_{25})_3$, $Al(C_{16}H_{33})_3$, etc. The catalyst can be used as such, but preferably is dispersed in an inert hydrocarbon solvent. Since it is desired to produce a liquid alpha olefin product, rather than a relatively high molecular weight solid polymer the catalyst defined above should be substantially free of catalyst components, such as, for example, $TiCl_4$, which will tend to cause production of relatively high molecular weight solid polymers. The amount of catalyst required herein is not critical and can be present in an amount from about $1 \times 10^{-4}$ to about $1 \times 10^{-2}$ mols, preferably from about $1.5 \times 10^{-4}$ to about $5.0 \times 10^{-3}$ mols, per mol of ethylene.

The temperature of the reaction can range from about 285° to about 615° F., generally from about 350° to about 430° F., preferably from about 380° to about 400° F. The upper pressure range is not critical and can be as high as about 1,000 atmospheres, or even higher, but the lower pressure range is critical and should be sufficiently high so that most of the alpha olefin product is a liquid under reaction conditions and so that most of the catalyst and most of the ethylene are dissolved or dispersed in the liquid. It is important to have as high as possible a concentration of ethylene in the phase containing the catalyst, otherwise olefin product rather than ethylene will tend to react with the catalyst to produce vinylidenes. Therefore, the pressure should be sufficiently high to force as much ethylene as possible into the liquid phase together with the catalyst. After there has been a conversion of about 50 to about 90 mol percent of ethylene, which can involve, for example, a residence time of at least about five minutes, preferably about 20 to about 120 minutes, there is sufficient liquid product to dissolve substantially all the ethylene and produce a single homogeneous phase in the reactor. Thus, the pressure in the reactor must at all times be at least about 500, and preferably at least about 2000 pounds per square inch gauge.

The reactor is desirably an elongated reactor, for example, wherein the ratio of length to internal diameter is from about 200:1 to about 100,000:1, but preferably within a range of about 2000:1 to about 50,000:1. In order to achieve the highest conversion of ethylene to normal alpha olefin per mol of catalyst used, the length of the reactor is made as long as possible and is only limited by practical and economic size restrictions and by pressure drop. There are a number of reasons for utilizing a very long tubular reactor. First, a very long tubular reactor permits excellent heat transfer for removal of heat of reaction. Second, it advantageously reduces backmixing, and with proper flow of material therein backmixing can be practically eliminated . Third, a long reactor length is conducive to long residence time, which permits achievement of a high catalyst efficiency because of additional conversion per mol of catalyst. Finally, a long reactor length tends to minimize the percentage of paraffin in the alpha olefin product. The final reason is based upon the fact that upon separation of the aluminum alkyl catalyst by treatment with caustic, the alkyl components of the catalyst are converted to paraffins which have boiling points close to those of the most desired alpha olefin components of the product and are therefore difficult to remove from the desired normal alpha olefins. Since the absolute amount of paraffins produced is fixed by the quantity of catalyst used, the greater the quantity of alpha olefins produced with said catalyst the smaller will be the percentages of paraffins in the product.

When it is desired to terminate the reaction, the product is withdrawn from the tubular reactor and is reduced in temperature and pressure, whereupon most of the gaseous olefins are flashed off. The liquid product is then treated in any suitable manner to deactivate the catalyst and the desired product fractions are recovered. The catalyst can be deactivated, for example, by contact with sufficient acid, base water or alcohol to react stoichiometrically with the catalyst. When an acid or base is employed an aqueous layer is formed, which is then separated from the organic layer, and the remainder, including the solvent for the catalyst, can be separated into its component parts by distillation. If desired, the catalyst can be deactivated by contact with oxygen or halogens or any other material which reacts with and suitably destroys the catalytic activity of organometallic compounds. In a preferred embodiment the aluminum catalyst is removed from the alpha olefin product by reaction with caustic solution to form $Na_2OAl_2O_3$ and paraffin as follows:

$$2H_2O + 2NaOH + 2AlR_3 \rightarrow Na_{20Al2}O_3 + 6 \text{ Paraffin}$$

The reaction is performed in the presence of an inert, unreactive hydrocarbon solvent, such as paraffins, high molecular weight olefinic materials, naphthenes or alkyl aromatics having 18, 20 or more carbon atoms, or a recycle stream comprising the $C_{18}$ or $C_{20}$ or even higher alpha olefin product of the process. As noted, the components in the alpha olefin product can have as many as about 40 carbon atoms, but more generally contains a small proportion of components above about 28 ot 30 carbon atoms. An advantageous solvent that can be employed herein, therefore, can comprise a $C_{18}$ or $C_{20}$ or higher alpha olefin recycle stream, or can be composed, for example, solely of $C_{22}$ to $C_{28}$ recycle alpha olefins. A solvent stream comprising other saturated or unsaturated, branched or unbranched hydrocarbons can also be used.

The solvent exerts its beneficial effect upon the process in the initial stages of the reaction, i.e., near the zone of the reactor tube whereat ethylene and catalyst are first contacted with each other, and after the reaction proceeds to a significant extent the product itself assumes the solvent function and eventually far exceeds in quantity the initially-added solvent. Catalyst which is continuously added to the reactor is advantageously dissolved in the solvent in any suitable concentration range, such as between about 0.5 to about 50 per cent by weight, preferably between about two and about 15 per cent by weight. The concentration of catalyst in the solvent will depend upon both the quantity of solvent desired in the system and upon the desired ratio of catalyst to ethylene charge.

Upon addition of catalyst and solvent to the ethylene charge in the reactor, substantially all the catalyst remains dissolved in the solvent. In order to encourage the production of normal alpha olefins in the reactor, it is important that as much as possible of the gaseous ethylene reactant be rapidly dissolved in the phase containing the catalyst, i.e., the liquid solvent phase. Under the temperature and pressure conditions of the reactor a substantial quantity of ethylene is almost immediately dissolved in the liquid solvent phase, enabling the reaction to proceed rapidly. As normal alpha olefin product is produced, this product, in turn, is available as a solvent, and as the reaction proceeds the product produced in the reactor becomes dominant in quantity.

It is important to maintain conversion levels of ethylene below the levels defined hereinabove, because at higher conversion levels the production of branched olefins (vinylidenes) increases sharply. The reason is that at high conversion levels the proportion of product olefin to ethylene in the reactor becomes sufficiently high for the product olefin to compete significantly with the ethylene in the growth reaction. The participation of any olefin higher than ethylene in the growth reaction results in a vinylidene product, and only by permitting ethylene exclusively to participate in the growth reaction is the product the desired normal alpha olefin.

Desirably no more than about 30 to about 90 mol per cent, preferably no more than about 50 to about 75 mol per cent, of ethylene is converted in the reactor. Most of the unreacted ethylene, for example, from about 75 to about 90 weight per cent thereof, is flashed from the total product by any means, for example, by reduction in pressure to about 50 to about 1,000 pounds per square inch gauge and a reduction in temperature to about 120° to about 200° F., and recycled for reuse in the process. Even though the ethane content of the fresh ethylene feed may have been small, for example, from about 0.010 to about 0.50 weight per cent, said ethane is also removed with unreacted ethylene, and with the recycle of the latter build-up of ethane in the system occurs. In addition, upon hydrolysis of the remainder of the polymerization product, paraffins, including ethane, are also formed. If the remainder of the ethylene is also recycled, such recycle will also include additional ethane that is present, and will contribute additional ethane build-up in the ethylene charge. In accordance with the discovery herein, it has been found that by maintaining the ethane content in the ethylene charge to the reactor below about 3.0 weight per cent, preferably in the range of about 0.1 to about 2.0 weight per cent, an improvement in catalyst and reactor efficiencies and an increase in reactor productivity is obtained. By "catalyst efficiency" we mean pounds of alpha olefin product obtained per pound of catalyst; "reactor efficiency", pounds of product per hour per cubic feet of reactor volume per weight fraction of catalyst in the total feed; and "reactor productivity", pounds of product per reactor per hour. Since ethane is substantially inert, it would be expected that whatever improvement would be obtained as a result of its removal would be directly proportional to its diluent effect. It has been found, however, that surprisingly the per cent improvement in catalyst efficiency, reactor efficiency and reactor productivity is in excess of that which would have been predicted by the substitution of ethylene for an equivalent amount of ethane.

The process can further be illustrated by the following. Three runs were made, each over a period of approximately four days, using an elongated tubular reactor having a length to internal diameter ratio of 34,500:1. In each instance a gas mixture containing ethylene, butene-1 and ethane was passed into one end of the reactor tube and a catalyst solution, heated to reaction temperature, containing triethyl aluminum dissolved in a $C_{22}$ to $C_{28}$ alpha olefin fraction from a previous operation, was introduced at a uniform rate into the reactor at a point 165 feet downstream from the point of introduction of said ethylene feed mixture. The tubular reactor was maintained submerged in a pressurized boiling water bath, the temperature of which could be closely controlled by making adjustments on the pressure of the system. In each instance the average reactor temperature was 398° F. and the average reactor pressure, at the outlet, was 3,350 pounds per square inch gauge. The effluent comprising predominantly $C_4$ to $C_{40}$ alpha olefins, unreacted ethylene and aluminum alkyls was discharged through the reactor pressure control valve, at which point the pressure of the system was reduced from 3,350 pounds per square inch gauge to about 600 pounds per square inch gauge, and the temperature of the effluent stream was reduced to 150° to 160° F. as it flowed through a heat exchanger. The major part of the unreacted ethylene was flashed off the product stream, purified and recycled to the process. The resulting product stream containing low concentration of unreacted ethylene, alpha olefin product and catalyst was discharged into a caustic treatment chamber. On contact with sodium hydroxide, the aluminum alkyls in the product stream were converted to water-soluble sodium aluminate and paraffins. The oil layer containing the product olefins, plus some unreacted ethylene, was discharged from the caustic chamber to a water wash tower where any residual sodium aluminate or free caustic was removed by effective contacting with large quantities of water. The oil or organic phase from the water wash tower was continuously fed to a fractionating section where individual olefins were separated by fractionation. A summary of these data, plus the quality of the product, are set forth in TABLE I below. The quality of the dodecene-1 fraction is used as a measure of the product quality in the comparisons.

TABLE I

| Run No. | Reactor feed gas | | | | | Catalyst solution | | Operating results, efficiencies | | | | $C_{12}$ fractionation product, weight percent | | | |
|---|---|---|---|---|---|---|---|---|---|---|---|---|---|---|---|
| | Pounds per hour | Composition, weight percent | | | | Pounds per hour | TEA content, weight percent | Conversion percent | Catalyst | Reactor | Reactor productivity | Normal alpha olefins | Vinylidene olefins | Internal olefins | Paraffins |
| | | $C_2H_4$ | $C_2H_6$ | $C_4H_8$ | Others | | | | | | | | | | |
| 1 | 4,703 | 93.6 | 5.5 | 0.4 | 0.5 | 237.5 | 5.14 | 61 | 220 | 4,085 | 2,685 | 94.0 | 4.32 | 0.40 | 1.28 |
| 2 | 4,703 | 96.5 | 2.7 | 0.5 | 0.3 | 221.0 | 5.17 | 60 | 238 | 4,406 | 2,723 | 94.5 | 3.85 | 0.40 | 1.25 |
| 3 | 4,703 | 96.9 | 1.8 | 1.0 | 0.3 | 248.0 | 5.31 | 68 | 235 | 4,377 | 3,099 | 94.2 | 3.95 | 0.65 | 1.20 |

The per cent improvement obtained in Runs Nos. 2 and 3 over Run No. 1 as a result in the reduction in the ethane content in the ethylene feed can be seen from TABLE II below.

TABLE II

Per Cent Improvement In

| Run No. | Catalyst Efficiency | Reactor Efficiency | Reactor Productivity |
|---|---|---|---|
| 1 | — | — | — |
| 2 | 8.1 | 7.8 | 3.3 |
| 3 | 6.8 | 7.1 | 15.4 |

From the above it can be seen that by reducing the ethane content from 5.5 per cent in Run No. 1 to 2.7 per cent in Run No. 2, that is, by 2,8 per cent, greater percentage improvements were obtained in catalyst efficiency, reactor efficiency and reactor productivity. Reducing the amount of ethane from 5.5 per cent in Run No. 1 to 1.8 per cent in Run No. 3, that is, by 3.7, resulted in improved catalyst efficiency and reactor efficiency, and greatly increase reactor productivity. The quality of the $C_{12}$ dodecene-1 fraction is used in the Table as a measure of the product quality. As can be seen, product quality remained constant during the runs.

Heretofore, an increase in reactor productivity was achieved by varying reactor temperature or catalyst feed rate. However, in accordance with the present invention an increase in reactor productivity is achieved at a constant temperature and at a constant feed rate and by maintaining a desirably low ethane content in the ethylene feed. An increase in reactor productivity by the methods of the prior are incurred accompanying disadvantages not inherent in the method of the present invention. For example, the productivity of a reactor can be increased by about 20 per cent with each 10° F. rise in reaction temperature at a constant conversion level. However, a 10° F. rise in reaction temperature results in a decrease of about 1.5 per cent in the normal alpha content of the full $C_{12}$ to $C_{16}$ fraction if no other reaction variables are changed because an increase in reaction temperature increases the rate of vinylidene and isoolefin formation.

Obviously, many modifications and variations of the invention, as hereinabove set forth, can be made without departing from the spirit and scope thereof and therefore only such limitations can be made as are indicated in the appended claims.

We claim:

1. In a process wherein a fresh ethylene stream containing from about 0.10 to about 0.50 weight per cent ethane and a recycle ethylene stream containing ethane are reacted with an aluminum trialkyl, the amount of said aluminum trialkyl present being from about $1.5 \times 10^{-4}$ to about $5.0 \times 10^{-3}$ mols per mol of ethylene in the total charge, at a temperature of about 350° to about 430°F. and a pressure of at least about 2,000 pounds per square inch gauge, and from about 50 to about 75 mol per cent of the ethylene in the total charge is converted to obtain a product predominating in normal alpha olefins and containing unreacted ethylene and ethane, the unreacted ethylene and ethane are separated from said product by flashing, the separated ethylene and ethane are recycled to said reaction, resulting in build-up of ethane in said reaction, the improvement which comprises maintaining the ethane content in the total ethylene charge to the reaction in the range of about 0.1 to about 3.0 weight per cent.

* * * * *